United States Patent [19]

Turlej

[11] Patent Number: 4,631,412

[45] Date of Patent: Dec. 23, 1986

[54] IONIZATION SMOKE DETECTOR

[76] Inventor: Zbigniew Turlej, 655 Indian Road, Mississauga, Ontario, Canada, L5H 1R2

[21] Appl. No.: 658,918

[22] Filed: Oct. 9, 1984

[30] Foreign Application Priority Data

Oct. 21, 1983 [CA] Canada .................................. 439445

[51] Int. Cl.[4] ........................ G01T 1/185; G08B 17/10

[52] U.S. Cl. ...................................... 250/381; 250/385

[58] Field of Search ............... 250/385, 381, 382, 384; 340/629, 628

[56] References Cited

U.S. PATENT DOCUMENTS 4,150,373 4/1979 Ried, Jr. .............................. 250/381

4,153,840 5/1979 Wieder ................................ 250/385

4,258,261 3/1981 Conforti ............................... 250/381

4,396,840 8/1983 Araki et al. .......................... 250/385

FOREIGN PATENT DOCUMENTS 886794 10/1971 Canada .

909400 9/1972 Canada .

*Primary Examiner*—Carolyn E. Fields

*Attorney, Agent, or Firm*—Ridout & Maybee

[57] ABSTRACT

In a smoke detector of the ionization type having inner, auxiliary and outer electrodes providing inner and outer ionization chambers disposed one within the other, the electrodes and the associated circuitry are mounted on one side of a printed circuit board, the outer electrode conforming to the configuration and dimensions of the circuit board so as to define a box-like enclosure.

8 Claims, 11 Drawing Figures

IONIZATION SMOKE DETECTOR

This invention relates to ionization smoke detectors.

BACKGROUND OF THE INVENTION

Ionization smoke detectors are of various types, the commonest comprising a system of electrodes whose respective potentials are dependent upon the flow of ionization current in separate chambers, and electronic circuitry interconnected with the electrodes for deriving an electrical signal in response to a change in the configuration of electrode potentials caused by the entry of smoke into one of the chambers. A suitable alarm device such as a piezoelectric horn is normally connected to output terminals of the electronic circuitry. An LED connected to the circuitry may also provide a visual indication of the alarm condition.

In one such type of smoke detector, to which the present invention relates, the electrode system comprises an inner electrode consisting of or supporting a radioactive material or otherwise providing a source of ionizing radiation, an outer electrode providing openings which allow the passage of smoke therethrough, and an auxiliary electrode positioned so as to define with the inner and outer electrodes, respectively, a first and a second ionization chamber disposed one within the other, the auxiliary electrode having a hole which is capable of passing radioactive rays from the inner electrode to the outer chamber so as to produce ionization simultaneously in both chambers.

Known smoke detectors of this type have the disadvantage that their structures tend to be large and often complicated, and they do not readily lend themselves to automatic assembly techniques during manufacture.

It is an object of the present invention to provide an improved smoke detector of this type which, besides having the desirable features of the known detectors has the added advantages of the simplicity of construction and ease of assembly during manufacture.

BRIEF SUMMARY OF THE INVENTION

According to one aspect of the present invention, in an ionization smoke detector of the type referred to, the electrodes and the electronic circuitry are mounted on one side of a support plate, the outer electrode conforming to the configuration and dimensions of the support plate so as to form therewith a box-like enclosure for the inner and auxiliary electrodes and for the electronic circuitry so mounted. Thus, for example, the outer electrode may be constituted by a rectangular box-like member having a closed top wall, perforate side walls which provide the openings for smoke to pass through, and an open bottom covered by the support plate on which it is mounted, the support plate also being rectangular in this case.

According to another aspect of the present invention, in an ionization smoke detector of the type referred to, the electrodes are mounted on one side of a support plate constituted by a printed circuit board on which components of the electronic circuitry are also mounted, the circuit board providing printed circuit elements interconnecting the electrodes with the mounted components and the terminals.

In order that the invention may be more readily understood, one embodiment thereof will now be described, by way of example, with reference to the accompanying drawings.

DETAILED DESCRIPTION

Figure 1:
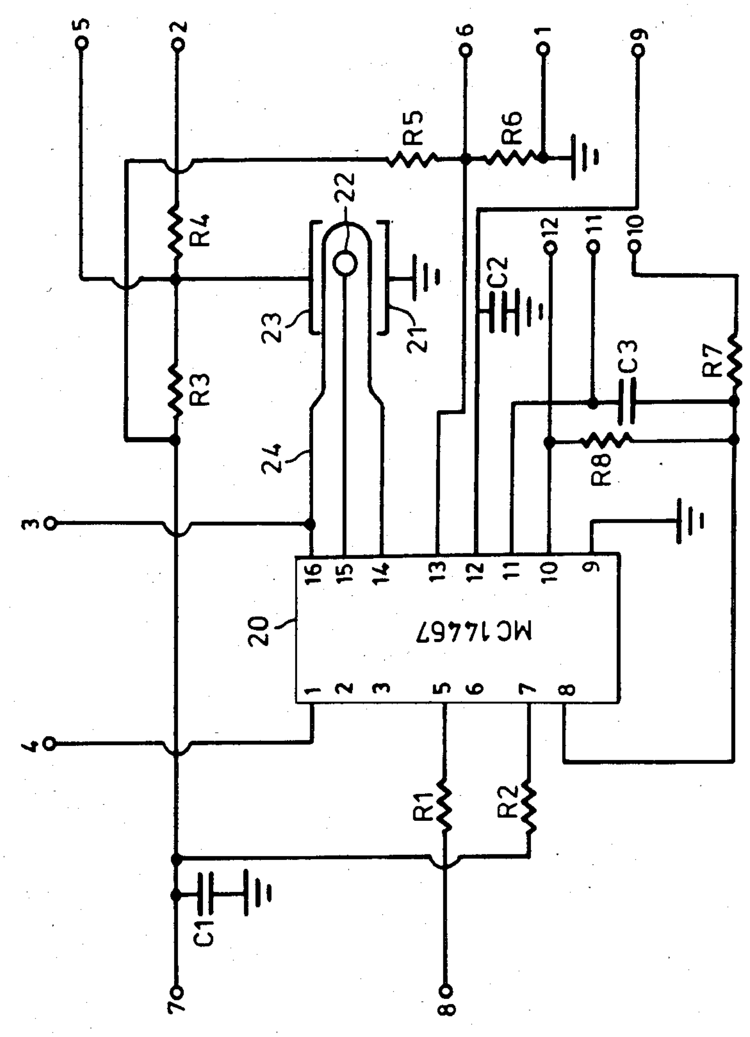
FIG. 1 is a schematic wiring diagram of an ionization smoke detector in accordance with the invention.
Figure 11:
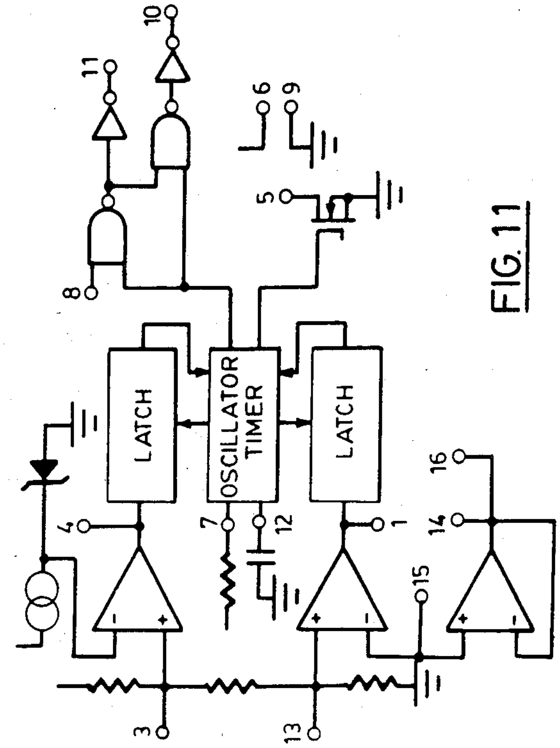
FIG. 11 is a block diagram of the integrated circuit as provided by the manufacturer.

Referring to FIG. 1, at the heart of the electronic circuitry is an integrated circuit 20, (the terminal numbering of which is also shown in FIG. 11). This circuitry could alternatively be implemented using discrete circuit components in the conventional way, but in the present example by the integrated component MC14467 of Motorola Inc., which is ideally suited to the purpose and facilitates the dual aims of simplicity of construction and ease of assembly. The internal logic circuitry of the chip is illustrated in the block diagram of FIG. 11.

The electrode system of the smoke detector comprises an inner electrode 21, which is grounded, as also is chip terminal 9, an auxiliary electrode 22, which is connected to chip terminal 15, and an outer electrode 23. Chip terminals 14, 16 are connected to an active guard conductor 24 associated with the auxiliary electrode 22, as hereinafter described. The components shown in FIG. 1 are mounted on a support plate in the form of a printed circuit board, the resistors $R_2$, $R_3$, $R_4$, $R_5$ and $R_6$ being screened and all the conductor connections being etched elements of the printed circuitry. In the illustrated circuit the resistive and capacitive components have the values given in Table 1.

TABLE 1

| | | |
|---|---|---|
| $R_1$ | 300 Ω | |
| $R_2$ | 1 MΩ | (screened) |
| $R_3$ | 1 MΩ | (screened) |
| $R_4$ | 1 MΩ | (screened) |
| $R_5$ | 1 MΩ | (screened) |
| $R_6$ | 1 MΩ | (screened) |
| $R_7$ | 150 KΩ | (discrete) |
| $R_8$ | 1.5 MΩ | (discrete) |
| $C_1$ | .1 μF | (discrete) |
| $C_2$ | .1 μF | (discrete) |
| $C_3$ | .001 μF | (discrete) |

The terminals of the circuit board, numbered 1 to 12, are mounted on the board and serve as follows. Terminal 7 is connected to the positive terminal of a 9 volt supply, the negative terminal of which is grounded. Terminal 8 provides a connection to a visual indicator such as an LED, while terminals 10, 11 and 12 are connected to an alarm device such as a piezoelectric horn.

Terminals 1 and 2 are provided for test purposes, terminal 1 being grounded. Terminals 3, 4, 5 and 6 are connected to various parts of the printed circuitry and are used only for diagnostic purposes.

Figure 2:
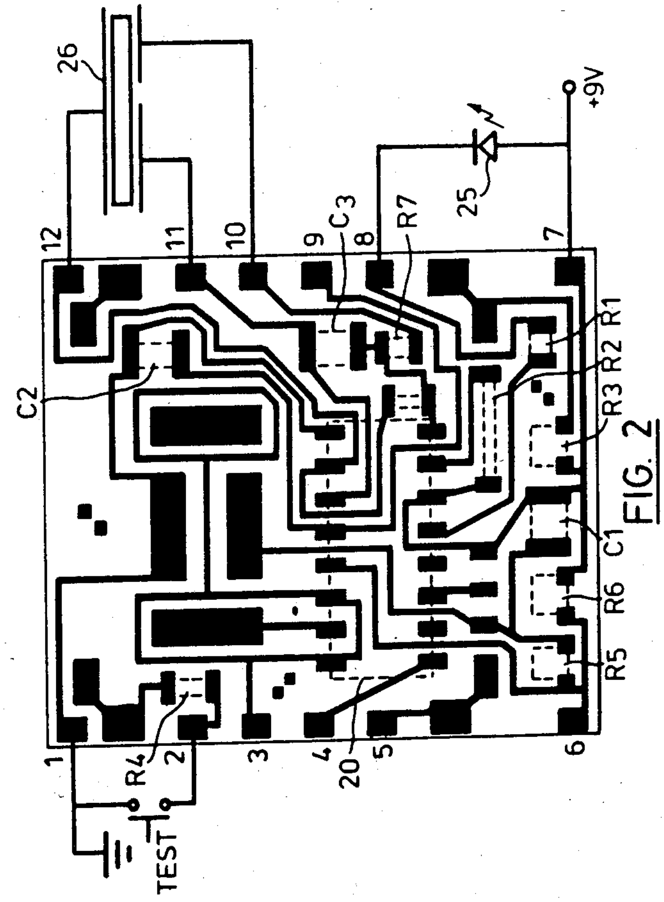
FIG. 2 is a plan view of the smoke detector with the electrodes removed to show the layout of the electronic circuitry.

The physical layout of the circuit board is shown in FIG. 2, in which the above-mentioned circuit elements and board terminals are shown and referenced. The Figure also shows the LED 25, connected across board terminals 7 and 8, and the piezoelectric horn 26, connected to board terminals 10, 11 and 12. The physical layout of the etched conductors of the circuit board is shown in FIG. 3, the mounted components and screened resistive components being omitted for clarity.

Figure 3:
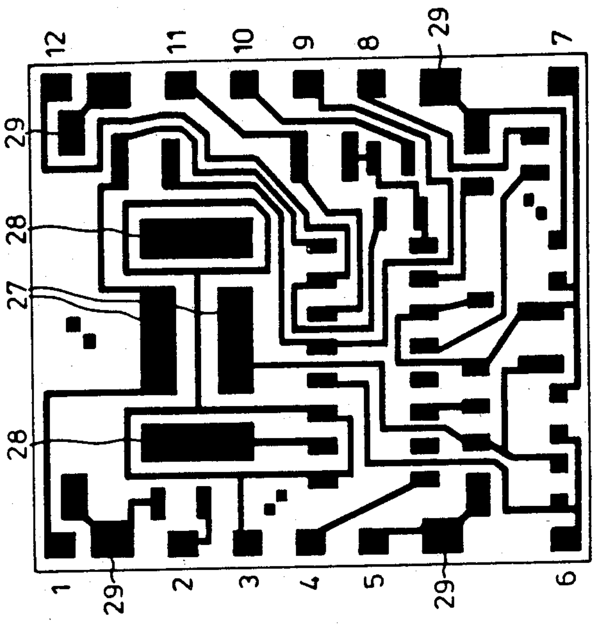
FIG. 3 is a plan view of the printed and etched circuit board showing only the connections between circuit elements.

In FIG. 3, the etched conductor paths 27 provide terminal connections to the inner electrode 21, which is soldered or otherwise mechanically and electrically connected to them. The etched conductor paths 28 provide terminal connections to the auxiliary electrode 22, which is soldered or otherwise mechanically and electrically connected to them. The active guard conductor 24 surrounds the elements 28. The four sets of etched conductor paths 29 adjacent to the corners of the circuit board provide terminal connections to the outer electrode 23, the feet of which are soldered or otherwise mechanically and electrically connected to them. At least one of the conductor elements 29 is electrically connected to a shield plate 30 (FIG. 4) which is laminated to the opposite side of the board, the connection preferably being made through a perforation in the insulating substrate of the board.

Figure 4:
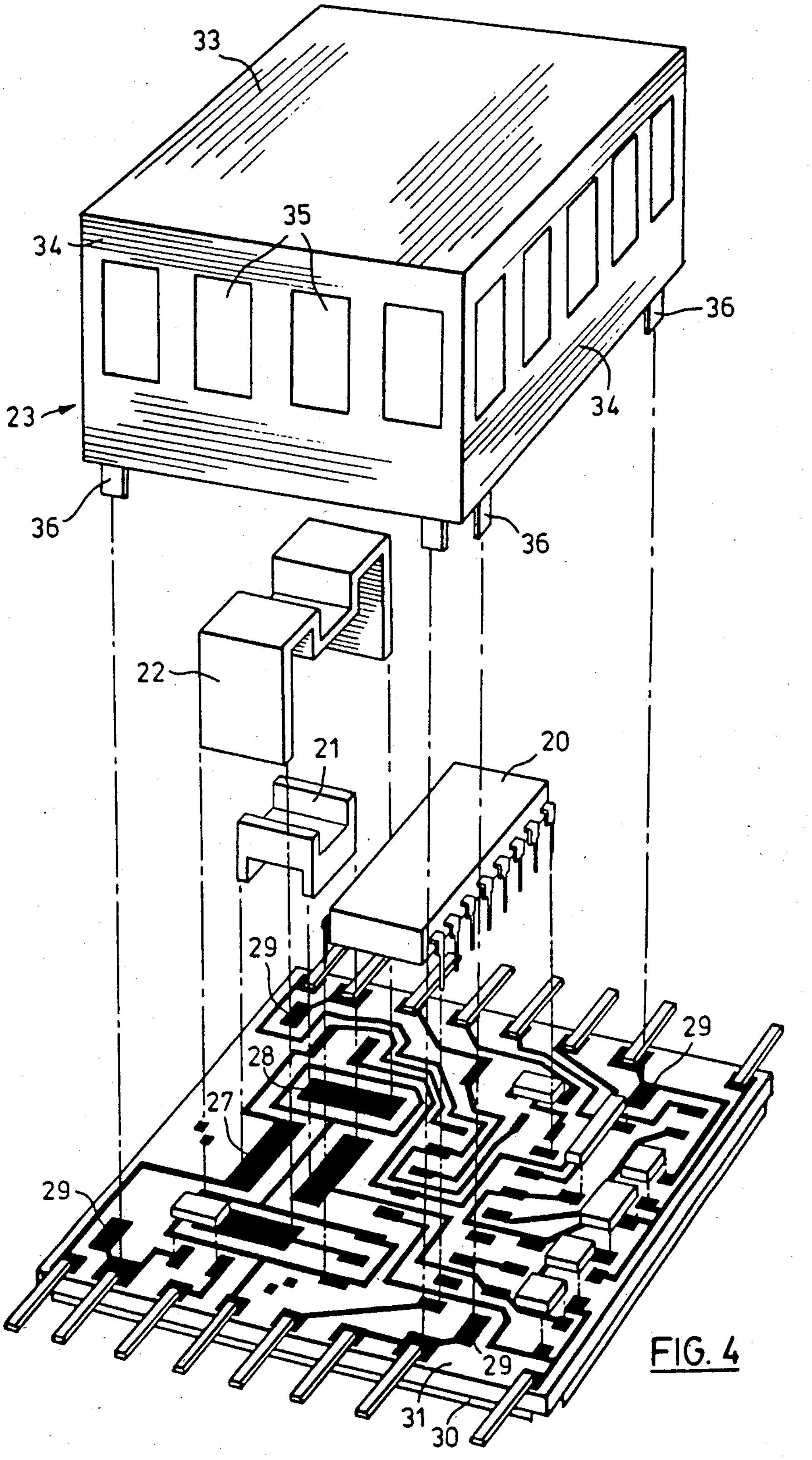
FIG. 4 is an exploded perspective view of the smoke detector.

FIG. 4 shows the physical configuration of the electrodes 21, 22 and 23, and their relationship to the circuit board. The circuit board itself serves as a support plate consisting of an insulating substrate 31, preferably square, the components of the electrical circuitry being screened and mounted as described above on the upper side of the board. The metallic shield plate 30 is laminated to the underside of the board. The inner electrode 21 is soldered to the etched elements 27 of the board, while the auxiliary electrode 22 is soldered to the etched elements 28 and covers the inner electrode so as to define therewith a first ionization chamber. The inner electrode 21 is adapted to support an ionizing source of radioactive material or, alternatively, it is made of or incorporates a radioactive material. The auxiliary electrode 22 is formed with a small central hole 32 through which ionizing radiation from the radioactive source can pass.

The outer electrode 23 is a rectangular box-like member having a closed top wall 33, side walls 34 formed with perforations 35, and an open bottom which in the assembled device is covered by the support plate so as to form a box-like enclosure for the inner and auxiliary electrodes and for the electronic circuitry of the device. The outer electrode is mounted so as to define a second or outer ionization chamber, the first ionization chamber being disposed within it. The outer electrode 23 is formed with feet 36 near its corners, these feet being soldered to the etched elements 29 of the circuit board.

The box-like outer electrode 23 conforms to the configuration and dimensions of the board. It will be noted that the lower edges of the side walls 34 are spaced slightly from the board, by the height of the feet 36, thus avoiding shorting of the board terminals and providing access to them for external connections.

The operation of a smoke detector of this type is well known. Smoke to be detected passes freely through the perforations 35 of the outer electrode 23, thereby impeding the ionization current of the outer ionization chamber and so changing the relative potentials of the electrodes by varying the potential of the auxiliary electrode; the electronic circuitry responds to such a condition and triggers the alarm device.

It will be seen that the inner and auxiliary electrodes 21, 22 are mounted quite close to one another, the spacing of the outer electrode 23 from the auxiliary electrode being relatively large. The inner and auxiliary electrodes are configured so as to achieve this close spacing; thus, the opposed surfaces of the inner and auxiliary electrodes are configured to provide reentrant portions which are interleaved so as to define the inner ionization chamber.

Figure 5:
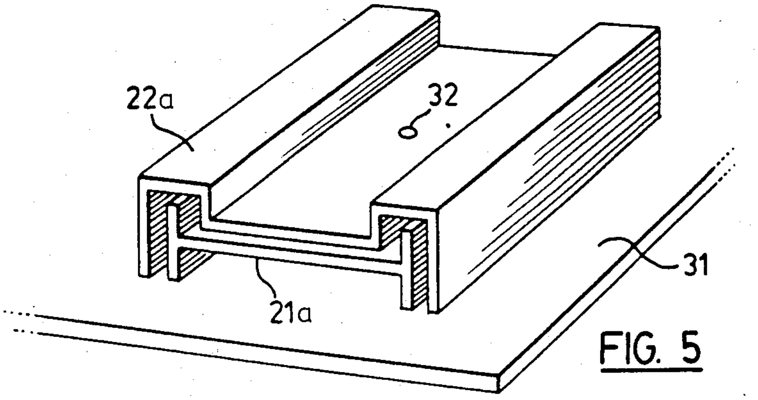
FIGS. 5, 6 and 7 illustrate three alternative configurations of the inner and auxiliary electrodes.
Figure 6:
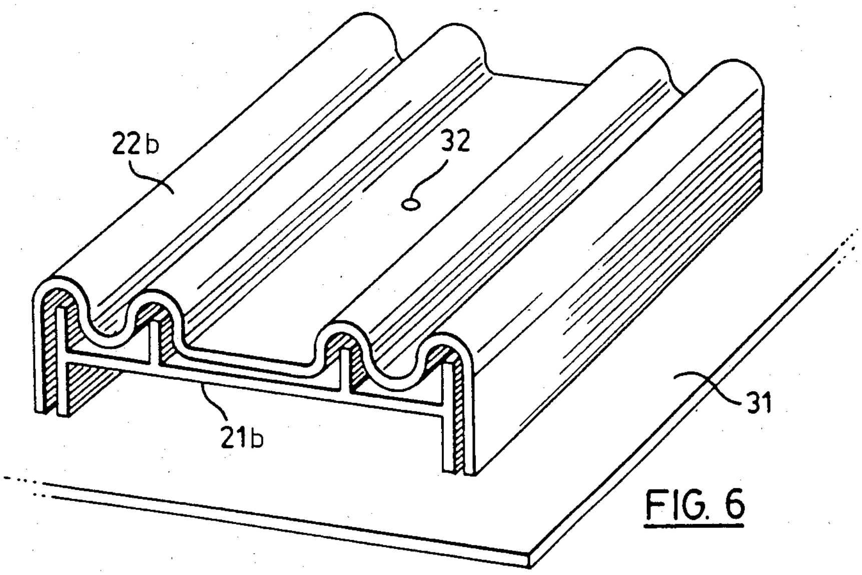
Figure 7:
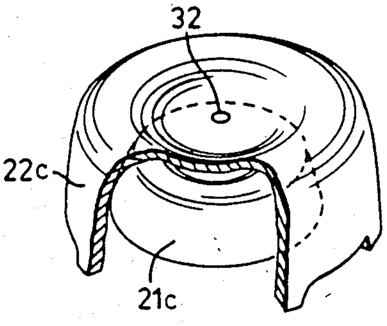
Figure 10:
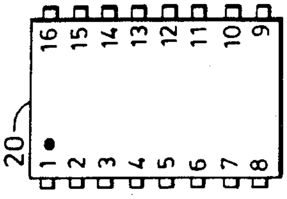
FIG. 10 illustrates the arrangement of terminals of an integrated circuit used in the detector.

FIG. 5 illustrates an alternative arrangement of the inner and auxillary electrodes **21*a*, 22*a* in the assembled device. FIG. 6 illustrates another alternative electrode arrangement similar to that of FIG. 5 but in which the opposed surfaces of the electrodes 21*b*, 22*b* are of extended area without lessening of the spacing between them. FIG. 7 illustrates yet another arrangement of the inner and auxiliary electrodes 21*c*, 22*c*** which, in this arrangement, are of annular shape and mounted concentrically one within the other.

The active guard circuitry is a feature of the integrated circuit chip 20, which is a commercially available item. The purpose of this circuitry is to reduce leakage across the surface of the board between the auxiliary electrode and the rest of the electronic circuitry. The general arrangement of the active guard on the surface of the circuit board is shown in FIG. 9. This detail shows the active guard conductor 24 which wholly surrounds the board terminals 28 for the auxiliary electrode 22 and is connected to the terminals 14 and 16 of the integrated circuit 20. The electrical arrangement of the active guard circuitry is shown in FIG. 8.

Figure 8:
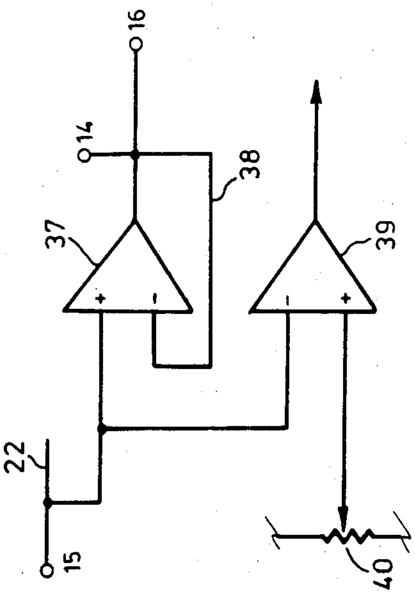
FIG. 8 is a schematic representation of the active guard circuitry used in the detector.
Figure 9:
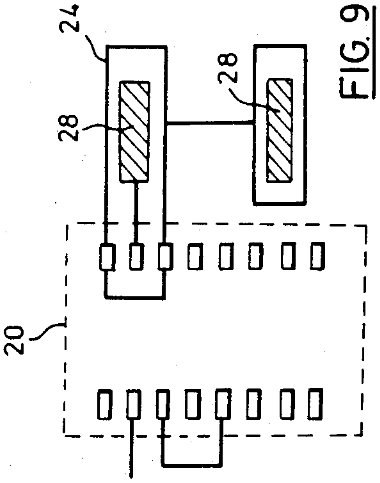
FIG. 9 illustrates the physical layout of the active guard.

Referring to FIG. 8, the active guard circuitry consists essentially of an operational amplifier 37 having a negative feedback loop 38, and a comparator 39. The positive input terminals of the amplifier 36 and the negative input terminal of the comparator 39 are connected to chip terminal 15 to which the auxiliary electrode 22 is connected. The output terminal of the amplifier is connected to the chip terminals 14, 16 to which the active guard conductor 24 is connected. The positive terminal of the comparator is connected to a preset resistor 40 which is supplied to provide a reference voltage. The output from the comparator is processed within the circuitry of the chip for providing an alarm signal to activate the alarm device in the event that the leakage current from the auxiliary electrode exceeds a predetermined value.

The electronic circuitry of the circuit board is preferably encapsulated, for example in epoxy resin, to exclude moisture and to minimize risk of physical damage.

As will be appreciated, the electrical circuitry of the smoke detector and its operation are well known, and no claim is made herein to the electrical operation of the device as such. However, the physical configuration and assembly of the various components in such a device so as to permit both reliable operation and ease of assembly in manufacture is an important consideration, and it is to that aspect of the smoke detector that the present invention is directed.

What is claim is:

1. An ionization smoke detector comprising an electrode system and electronic circuitry interconnected therewith for deriving an electrical signal in response to the detection of smoke, the electronic circuitry providing terminals for connection to an alarm device, the electrode system comprising an inner electrode providing a source of ionizing radiation, an outer electrode providing openings to allow smoke to pass therethrough, and an auxiliary electrode positioned to define with said inner and outer electrodes, respectively, a first and a second ionization chamber disposed one within the other, the auxiliary electrode having a hole capable of passing radioactive rays so as to produce ionization simultaneously in both chambers, wherein the electrodes and electronic circuitry are surface mounted on one side of a support plate, the outer electrode conforming to the configuration and dimensions of the support plate so as to form therewith a box-like enclosure for the inner and auxiliary electrodes and electronic circuitry so mounted, the detector further comprising a shield plate laminated to the other side of the support plate and electrically connected to the outer electrode to form an electrically shielded enclosure for the electronic circuitry.

2. An ionization smoke detector according to claim 1, wherein the support plate is rectangular.

3. An ionization smoke detector according to claim 2, wherein the outer electrode is constituted by a rectangular box-like member having a closed top wall, perforate side walls, and an open bottom covered by the support plate on which it is mounted.

4. An ionization smoke detector according to claim 1, 2 or 3, wherein the opposed surfaces of the inner and auxiliary electrodes are configured to provide reentrant portions which are interleaved so as to define the inner ionziation chamber.

5. An ionization smoke detector according to claim 1, 2 or 3, wherein the inner ionziation chamber is annular.

6. An ionization smoke detector according to claim 1, wherein the support plate is constituted by a printed circuit board on which components of the electronic circuitry are surface mounted, the circuit board providing printed or etched circuit elements interconnecting the electrodes with said surface mounted components and said terminals.

7. An ionization smoke detector according to claim 6, wherein the printed or etched circuit elements of the circuit board include terminal connections to the auxiliary electrode and active guard elements surrounding said terminal connections and interconnected with active guard circuitry.

8. An ionization smoke detector according to claim 7, wherein the electronic circuitry includes an integrated circuit element providing said active guard circuitry.

* * * * *